under 35 U.S.C. 154(b) by 0 days.

United States Patent
Yukawa et al.

(10) Patent No.: US 12,448,625 B2
(45) Date of Patent: Oct. 21, 2025

(54) HYDROGENOPHILUS BACTERIUM TRANSFORMANT

(71) Applicant: Utilization of Carbon Dioxide Institute Co., Ltd., Tokyo (JP)

(72) Inventors: Hideaki Yukawa, Tokyo (JP); Naoto Ohtani, Tokyo (JP)

(73) Assignee: Utilization of Carbon Dioxide Institute Co., Ltd., Tokyo (JP)

( * ) Notice: Subject to any disclaimer, the term of this patent is extended or adjusted under 35 U.S.C. 154(b) by 0 days.

(21) Appl. No.: 18/937,712

(22) Filed: Nov. 5, 2024

(65) Prior Publication Data
US 2025/0084422 A1    Mar. 13, 2025

Related U.S. Application Data

(63) Continuation-in-part of application No. 17/292,870, filed as application No. PCT/JP2018/045781 on Dec. 12, 2018, now Pat. No. 12,331,300, application No. 18/937,712, filed on Nov. 5, 2024 is a continuation-in-part of application No. 17/292,867, filed as application No. PCT/JP2018/044226 on Nov. 30, 2018, now abandoned.

(51) Int. Cl.
| | | |
|---|---|---|
| C12N 1/20 | (2006.01) | |
| C12N 9/10 | (2006.01) | |
| C12N 15/74 | (2006.01) | |
| C12P 13/08 | (2006.01) | |

(52) U.S. Cl.
CPC ............ *C12N 15/74* (2013.01); *C12N 1/20* (2013.01); *C12N 9/1022* (2013.01); *C12P 13/08* (2013.01); *C12Y 202/01006* (2013.01)

(58) Field of Classification Search
CPC .... C12N 9/0006; C12N 9/0004; C12N 15/74; C12P 7/56; C12Y 101/01027; C12Y 101/01037
USPC ..................................................... 435/252.3
See application file for complete search history.

(56) References Cited

PUBLICATIONS

Devos et al., (Proteins: Structure, Function and Genetics, 2000, vol. 41: 98-107.*
Whisstock et al., (Quarterly Reviews of Biophysics 2003, vol. 36 (3): 307-340.*
Witkowski et al., (Biochemistry 38:11643-11650, 1999.*
Hydrogenophilus thermoluteolus https://www.ncbi.nlm.nih.gov/Taxonomy/Browser/wwwtax.cgi?id=297 retrieved Mar. 24, 2025.*

* cited by examiner

*Primary Examiner* — Tekchand Saidha
*Assistant Examiner* — Mohammad Y Meah
(74) *Attorney, Agent, or Firm* — Morgan, Lewis & Bockius LLP

(57) ABSTRACT

A transformant obtained by introducing (a) a lactate dehydrogenase gene and/or (b) a malate/lactate dehydrogenase gene into a *Hydrogenophilus* bacterium efficiently produces lactic acid through use of carbon dioxide as a sole carbon source. *Parageobacillus thermoglucosidasius* ldh gene, *Geobacillus kaustophilus* ldh gene and *Thermus thermophilus* ldh gene of lactate dehydrogenases, and *Thermus thermophilus* mldh gene and *Meiothermus ruber* mldh-1 and mldh-2 genes of malate/lactate dehydrogenases are preferable in that they have good lactic acid production efficiency.

21 Claims, No Drawings
Specification includes a Sequence Listing.

SEQUENCE LISTING

```
Sequence total quantity: 34
SEQ ID NO: 1              moltype = DNA   length = 960
FEATURE                   Location/Qualifiers
source                    1..960
                          mol_type = genomic DNA
                          organism = Parageobacillus thermoglucosidasius
SEQUENCE: 1
atgaaacaac aaggcatgaa tcgagtagca cttataggaa cggggttcgt tggggccagc   60
tatgcatttg cccttatgaa ccaaggaata gcagatgagt tagtattgat tgatgtaaat  120
aagaataagg cagagggcga tgtgatggat ttaaatcacg gaaaagtatt cgcgccgaag  180
ccgatgaata tttggtttgg agattatcaa gattgccaag acgccgattt ggtggtgatt  240
tgtgcagggg ctaaccaaaa gccgggagaa acaagactgg atcttgttga caaaaatatt  300
aatatcttca aaacgattgt cgattctgtg atgaaatccg gatttgatgg cgttttttct  360
gtggcaacga acccagtgga tattttaacg tatgctactt ggaaatttag cgggttaccg  420
aaagagcggg taatcggctc aggaacgatt cttgatacag caagattccg cttcttgcta  480
agtgaatatt ttcaagtggc tccgaccaat gtacatgcgt atattattgg cgagcatggg  540
gatacagagc tgcctgtttg gagccatgcg gaaattggaa gcattccagt tgagcaaata  600
ttgatgcaaa acgataacta tagaaaagag gatttagaca atatctttgt taatgttcgt  660
gatgcggcat atcaaatcat tgagaaaaaa ggggcaacgt attacggcat tgcaatggga  720
ttagtccgta tcactcgtgc tattttgcac aatgaaaatg ccatcttaac cgtttctgct  780
catttggacg gccaatatgg cgaacgaaat gtttatattg gcgtgcctgc cattatcaac  840
cgaaacggta ttcgtgaagt gatggaattg acgctaaatg aaacagaaca acaacaattc  900
catcatagtg taactgtatt aaaagacatt cttttcccgt tattttgatga tgtaaaataa  960

SEQ ID NO: 2              moltype = DNA   length = 954
FEATURE                   Location/Qualifiers
source                    1..954
                          mol_type = genomic DNA
                          organism = Geobacillus kaustophilus
SEQUENCE: 2
atgaaaaacg ggagaggaaa tcgggtagcg gtcgtcggca ccggtttgt cggcgccagt   60
tatgcgtttg ccttaatgaa tcaagggatt gccgatgaga tcgtgctcat cgatgcaaat  120
gaaaacaagg ctgagggcga tgcgatggac ttcaaccatg gaaagtatt tgcgccgaag  180
ccggctgaca tttggcacgg cgattacgat gattgccgcg atgccgattt ggttgtcatt  240
tgcgccggc ccaaccaaaa accgggcgag acgcggcttg atcttgtgga caaaaacatt  300
gccatttttcc gctcgatcgt tgagtcggtc atggcatccg gatttcaagg actgtttctc  360
gtcgccacca atccggtcga cattttaacg tacgcgacgt ggaaattcag cggcctgccg  420
caagagcgag taatcggatc gggcacgatt ttggacacgg cgcggttccg cttcttgttg  480
ggcgactatt tcgccgtcgc cccgacgaac gtgcacgcct atattatcgg cgaacatggc  540
gacactgaac tcccggtctg gagccaggct gatatcggcg tgccgat ccgcaagctg  600
gtcgagtcta aagggaaga gcgcaaaaa gagctcgagc gcattttgt caatgtgcgc  660
gatgccgcct accaaattat tgagaaaaaa ggagcgacgt actacgggat tgctatgggg  720
cttgcccgcg tgacgcgcgc cattttgcat catgaaaatg ccattttgac cgtttccgct  780
tacttggacg gcccatacgg cgaacgcgat gtctacatcg gtgtgcctgc tgtgatcaac  840
cgaaatggca tccgcgaagt gattgaaatt gaacttgacg aggaggagaa aaaatggttc  900
caccgtagtg ctgcgacgtt aaaaggtgta ttggcgcgct attttgctca gtaa         954

SEQ ID NO: 3              moltype = DNA   length = 933
FEATURE                   Location/Qualifiers
source                    1..933
                          mol_type = genomic DNA
                          organism = Thermus thermophilus
SEQUENCE: 3
atgaaggtcg gcatcgtggg aagcggcatg gtggggagcg ccaccgccta cgccctggcc   60
ctcctcggcg tggcgcggga ggtggtcctc gtggacctgg accggaagct ggcccaggcc  120
cacgccgagg acatcctcca cgccacgccc ttcgcccacc cggtctgggt gcgggcgggg  180
tcgtacgggg acctcgaggg ggccggggcg gtggtgctcg cgccggggt ggccagcgc  240
cccggggaga cccgcctgca gcttctggac cgcaacgccc aggtcttcgc ccaggtggtg  300
ccccgggttt tagaggcggc cccggaggcg tgctcctcg tggccacgaa cccggtggac  360
gtgatgaccc aggtggccta ccgcctctcc ggcctgcccc ggggcgggt ggtgggctcg  420
gggacgatcc tggacaacgg ccgcttccgg gcccttctgg cggagtacct ccgggtggcc  480
ccccagtcgg tccacgccta cgtgctgggg gagcacgggg actcggaggt gctggtctgg  540
tccagcgccc aggtgggcgg ggtgccccctc ctggagttcg ccgaggcccg ggggcgggcc  600
ctttccccgg aggaccgggc ccgcattgac gaaggggtcc gccgggccgc ctaccggatc  660
attgaggga aggggccac ctactacgga atcggggcg gcctcgcccg gcttgtgcgg  720
gccatcctca ccgacgaaaa gggggtgtac accgtgagcg ccttcacccc cgaggtggag  780
ggggtcttgg aggtgagcct ctccctgccc cgcatcctgg gcgcggggg cgtggagggg  840
accgtctacc cgagcctgag cccggaggag cggaggcct tgcggcggag cgccgagatc  900
ctcaaggagg cggccttcgc cctggggttt tag                                933

SEQ ID NO: 4              moltype = AA    length = 319
FEATURE                   Location/Qualifiers
source                    1..319
                          mol_type = protein
                          organism = Parageobacillus thermoglucosidasius
SEQUENCE: 4
MKQQGMNRVA LIGTGFVGAS YAFALMNQGI ADELVLIDVN KNKAEGDVMD LNHGKVFAPK  60
PMNIWFGDYQ DCQDADLVVI CAGANQKPGE TRLDLVDKNI NIFKTIVDSV MKSGFDGVFL 120
```

```
VATNPVDILT YATWKFSGLP KERVIGSGTI LDTARFRFLL SEYFQVAPTN VHAYIIGEHG   180
DTELPVWSHA EIGSIPVEQI LMQNDNYRKE DLDNIFVNVR DAAYQIIEKK GATYYGIAMG   240
LVRITRAILH NENAILTVSA HLDGQYGERN VYIGVPAIIN RNGIREVMEL TLNETEQQQF   300
HHSVTVLKDI LSRYFDDVK                                               319

SEQ ID NO: 5              moltype = AA   length = 317
FEATURE                   Location/Qualifiers
source                    1..317
                          mol_type = protein
                          organism = Geobacillus kaustophilus
SEQUENCE: 5
MKNGRGNRVA VVGTGFVGAS YAFALMNQGI ADEIVLIDAN ENKAEGDAMD FNHGKVFAPK    60
PADIWHGDYD DCRDADLVVI CAGANQKPGE TRLDLVDKNI AIFRSIVESV MASGFQGLFL   120
VATNPVDILT YATWKFSGLP QERVIGSGTI LDTARFRFLL GDYFAVAPTN VHAYIIGEHG   180
DTELPVWSQA DIGGVPIRKL VESKGEEAQK ELERIFVNVR DAAYQIIEKK GATYYGIAMG   240
LARVTRAILH HENAILTVSA YLDGPYGERD VYIGVPAVIN RNGIREVIEI ELDEEEKKWF   300
HRSAATLKGV LARYFAQ                                                 317

SEQ ID NO: 6              moltype = AA   length = 310
FEATURE                   Location/Qualifiers
source                    1..310
                          mol_type = protein
                          organism = Thermus thermophilus
SEQUENCE: 6
MKVGIVGSGM VGSATAYALA LLGVAREVVL VDLDRKLAQA HAEDILHATP FAHPVWVRAG    60
SYGDLEGARA VVLAAGVAQR PGETRLQLLD RNAQVFAQVV PRVLEAAPEA VLLVATNPVD   120
VMTQVAYRLS GLPPGRVVGS GTILDTARFR ALLAEYLRVA PQSVHAYVLG EHGDSEVLVW   180
SSAQVGGVPL LEFAEARGRA LSPEDRARID EGVRRAAYRI IEGKGATYYG IGAGLARLVR   240
AILTDEKGVY TVSAFTPEVE GVLEVSLSLP RILGAGGVEG TVYPSLSPEE REALRRSAEI   300
LKEAAFALGF                                                         310

SEQ ID NO: 7              moltype = DNA   length = 1035
FEATURE                   Location/Qualifiers
source                    1..1035
                          mol_type = genomic DNA
                          organism = Thermus thermophilus
SEQUENCE: 7
atgaggtggc gggcggactt cctctcggcc tgggcggagg ccctcttgcg aaaggcggga    60
gcggacgaac cctccgccaa ggcggtggcc tgggccctgg tggaggcgga cctcaggggg   120
gtgggaagcc acgggctttt gcgccttccc gtttacgtgc gccgcctcga ggcgggcctg   180
gtgaacccca gccccaccct gccctgag aacggggcc cgtggccct cctgacggg      240
gagcacggct tcgaccccg cgtggcccta aggccgtgg aggcggccca aagcctcgca    300
aggaggcacg gcctcgggggc cgtggggtg cggcggagca ccacttggc catgcggga    360
ctctacgcgg agaagctcgc ccggggggc ttcgtggcct gggtcaccac caacgccgag   420
cccgacgtgg tgcccttcgg ggggcgggag aaggccttgg gcaccaaccc tctgccttc   480
gccgccccgg ccctcaggg atcctcgtg ccgacctgg ccaccctgga aagcgccatg     540
ggcaaggtct tcctagcccg ggagaagggg gagcggatcc ccccaagctg ggggtggac   600
cgggaggggga gccccacgga cgaccccac cgggtctacg ccctgaggcc cctcggggga   660
cccaaggggt acgccctggc ccttttggtg gagtgctct cggggggtgct cacggggggcg   720
ggggtggccc acggcatcgg ccgcatgtac gacgagtggg accgccccca ggacgtggcc   780
cacttcctcc tggccctgga cccggggcgc ttcgtgggca aagaggcctt cctgagcgg    840
atgggggcccc tttggcaagc cctaaaggcc actcccccgg cgccgggca cgaggaggtc   900
ttcctccccg gggagttgga ggcaggagg cggggagcggg ccctggccga ggggatggcc   960
cttccggagc gggtggtggc ggagcttaag gccttggggg agcgctacgg cgtgccttgg   1020
agggacgatg cttga                                                   1035

SEQ ID NO: 8              moltype = DNA   length = 1011
FEATURE                   Location/Qualifiers
source                    1..1011
                          mol_type = genomic DNA
                          organism = Meiothermus ruber
SEQUENCE: 8
atgcaaggca ttcctgtgca caactgcgc gagcgggtgg agcagattct aataaaccgg    60
ggcttacgc tggagaatgc tctacccatc gcagaatccc tggtgctggc cgagatgcgg   120
ggggttgcct cgcacggcct gatccgactg cccatctacc tcgagcgcgc ccgactgggt   180
tcggtaaaaac cccaggcccg gccgtgctg ctggcggatt atccagccct ggccctgctg   240
gatgcccagg atggtcacgg catcccctcc ggcttgaaag cgatggagct ggccattgaa   300
aaagcccaga aggtgggcct ggccgctgtg ggggtgcggc gctcgagcca ctttggcctg   360
gcctggtact tcgtcgcag cgcagtgaa aaggggctgg tcggcgtgc actctccaa     420
gccgatgcgc tggtggcccc ctgggggcgc gcagccgct ttctgggcac caaccccctg    480
gctgtgggca tccggccat ggaggaaccc cccatgcccc tggacatggc caccagcgag   540
gccgcccacg gcaaaattt gctggccaag tccagcggga aaaccatccc cctcaactgg   600
gccctcgatg cggagggggcg gccaccgac gaccccgacc gggccctggc cggcgccctg   660
ctgccttttg ggggcgccaa gggatcggcc atcagcctca tcattgatgt gctgtcggc    720
ccactcgtgg gcgctctgat tggccccgag atcgcccgc tctacaccga gcccgaacgg   780
ccccagggcc tgggccattt ttttatggcc ctgaacccgg gtgttttgg cgacgccgaa   840
cagtttagaa agcaggtcga gcgtacatt gcagggttc gcgcgctgcc tccgccgaa    900
aacgtcgatc gggttctact gccaggcgaa cgcgagtgg ggcctcgagca aaaagcgcta   960
caggaggggg tgtctctaag cccagaggcc gctaaagcgg tgggccttta a          1011
```

```
SEQ ID NO: 9              moltype = DNA   length = 999
FEATURE                   Location/Qualifiers
source                    1..999
                          mol_type = genomic DNA
                          organism = Meiothermus ruber
SEQUENCE: 9
atgagggttc cttatcccgt actcaagcag gcggtctcga gccacttcca gggcctgggg   60
ctggccccgg atcatgccga ggccttcacc gaggtgatcc tcgaggccga gctcgagggc  120
aacctgggc  acggcctgac ccggattgcc cagtacaccg cccagctaca ggccggtggg  180
ctcaacccc  ggccgcagat gcgtttggaa cgaaccaaac ccggggttgc agttctgcat  240
gccgacggcg cacccgggcc ggtggccggg ctttttgcag tgcaggcgct ggccccgatg  300
gccagggagc agggaagcgc cgccctggcc gtgcgcggcg cggggcattc cggggtgctc  360
tcggcgtacg tgggccggct ggcccaagag ggcctggcct tgccaacacc               420
cccccggcca tcgccccggg gccggtgctg gcaccaacc  ccatcgccct gggcgcgccg   480
gccgagcccc agccggtcat cattgatacc tccatctcgg tggtggcgcg cggcaagatc   540
atcgccgcg  ctaaaaaggg cgagcccatc ccgccgggct gggcgctcga caaggagggt  600
cgcccaacca ccgatgccaa ggctgcgctg gaaggctcac tgctgcccat tgcgagggc  660
aagggggttt cgctggcagt gctggtggaa attctggccg gggccctggc gggcgacgtg  720
ctctcgcccg agctgcccct gccctggatg ccccagcgc  aggccgccaa gccggggctg  780
ctgctgctgg cctttgaccc cgccgccttt ggccgggct  acaggggccg ggtggcccag  840
ctcatcgagg ctcttaaagc ggccggaggc cggattcccg gtgcgcgccg ggccgcttta  900
cgagagaaag ccttggccgga aggtctggag gtcaaccaga cgcttcaggc cgaactcggt  960
acactaggcg tgcatctaca aggaggaggg acaagatga                          999

SEQ ID NO: 10             moltype = AA    length = 344
FEATURE                   Location/Qualifiers
source                    1..344
                          mol_type = protein
                          organism = Thermus thermophilus
SEQUENCE: 10
MRWRADPFLSA WAEALLRKAG ADEPSAKAVA WALVEADLRG VGSHGLLRLP VYVRRLEAGL   60
VNPSPTLPLE ERGPVALLDG EHGFGPRVAL KAVEAAQSLA RRHGLGAVGV RRSTHFGMAG  120
LYAEKLAREG FVAWVTTNAE PDVVPFGGRE KALGTNPLAF AAPAPQGILV ADLATSESAM  180
GKVFLAREKG ERIPPSWGVD REGSPTDDPH RVYALRPLGG PKGYALALLV EVLSGVLTGA  240
GVAHGIGRMY DEWDRPQDVG HFLLALDPGR FVGKEAFLER MGALWQALKA TPPAPGHEEV  300
FLPGELEARR RERALAEGMA LPERVVAELK ALGERYGVPW RDDA                   344

SEQ ID NO: 11             moltype = AA    length = 336
FEATURE                   Location/Qualifiers
source                    1..336
                          mol_type = protein
                          organism = Meiothermus ruber
SEQUENCE: 11
MQGIPVQQLR ERVEQILINR GFTLENALPI AESLVLAEMR GVASHGLIRL PIYLERARLG   60
SVKPQARPVL LADYPALALL DAQDGHGIPS GLKAMELAIE KAQKVGLAAV GVRRSSHFGL  120
AWYFVRSAVE KGLVGVALSN ADALVAPWGA RSRFLGTNPL AVGIPAMEEP PIALDMATSE  180
AAHGKILLAK SSGKTIPLNW ALDAEGRPTD DPDRALAGAL LPFGGPKGSA ISLLIDVLCG  240
PLVGALIGPE IAPLYTEPER PQGLGHFFMA LNPGVFGDAE QFRKQVDAYI RRVRALPPAE  300
NVDRVLLPGE REWRLEQKAL QEGVSLSPEA AKAVGL                            336

SEQ ID NO: 12             moltype = AA    length = 332
FEATURE                   Location/Qualifiers
source                    1..332
                          mol_type = protein
                          organism = Meiothermus ruber
SEQUENCE: 12
MRVPYPVLKQ AVSSHFQGLG LAPDHAEAFT EVILEAELEG NLGHGLTRIA QYTAQLQAGG   60
LNPRPQMRLE RTKPGVAVLH ADGAPGPVAG LFAVQALAPM AREQGSAALA VRGAGHSGVL  120
SAYVGRLAQE GLVALAFANT PPAIAPGPVL GTNPIALGAP AEPQPVIIDT SISVVARGKI  180
IAAAKKGEPI PPGWALDKEG RPTTDAKAAL EGSLLPIGEG KGFALAVLVE ILAGALAGDV  240
LSPELPLPWM PPAQAAKPGL LLLAFDPAAF GPGYRGRVAQ LIEALKAAGG RIPGARRAAL  300
REKALAEGLE VNQTLQAELG TLGVHLQGGG TR                                332

SEQ ID NO: 13             moltype = DNA   length = 35
FEATURE                   Location/Qualifiers
misc_feature              1..35
                          note = PCR primer
source                    1..35
                          mol_type = other DNA
                          organism = synthetic construct
SEQUENCE: 13
cgtggccaac taggcccagc cagatactcc cgatc                              35

SEQ ID NO: 14             moltype = DNA   length = 35
FEATURE                   Location/Qualifiers
misc_feature              1..35
                          note = PCR primer
source                    1..35
```

```
                        mol_type = other DNA
                        organism = synthetic construct
SEQUENCE: 14
tgaggcctca ttggccggag cgcaacccac tcact                              35

SEQ ID NO: 15           moltype = DNA   length = 35
FEATURE                 Location/Qualifiers
misc_feature            1..35
                        note = PCR primer
source                  1..35
                        mol_type = other DNA
                        organism = synthetic construct
SEQUENCE: 15
ctgggcctag ttggccacgt agaaagccag tccgc                              35

SEQ ID NO: 16           moltype = DNA   length = 35
FEATURE                 Location/Qualifiers
misc_feature            1..35
                        note = PCR primer
source                  1..35
                        mol_type = other DNA
                        organism = synthetic construct
SEQUENCE: 16
tccggccaat gaggcctcag aagaactcgt caaga                              35

SEQ ID NO: 17           moltype = DNA   length = 83
FEATURE                 Location/Qualifiers
misc_feature            1..83
                        note = PCR primer
source                  1..83
                        mol_type = other DNA
                        organism = synthetic construct
SEQUENCE: 17
gcattaatcc ttggactcct gttgatagat ccagtaatga cctcagaact ccatctggat   60
ttgttcagaa cgctcggttg ccg                                           83

SEQ ID NO: 18           moltype = DNA   length = 83
FEATURE                 Location/Qualifiers
misc_feature            1..83
                        note = PCR primer
source                  1..83
                        mol_type = other DNA
                        organism = synthetic construct
SEQUENCE: 18
caccgtgcag tcgatggatc tggattctca ccaataaaaa acgcccggcg gcaaccgagc   60
gttctgaaca aatccagatg gag                                           83

SEQ ID NO: 19           moltype = DNA   length = 50
FEATURE                 Location/Qualifiers
misc_feature            1..50
                        note = PCR primer
source                  1..50
                        mol_type = other DNA
                        organism = synthetic construct
SEQUENCE: 19
ttattggtga gaatccagat ccatcgactg cacggtgcac caatgcttct              50

SEQ ID NO: 20           moltype = DNA   length = 70
FEATURE                 Location/Qualifiers
misc_feature            1..70
                        note = PCR primer
source                  1..70
                        mol_type = other DNA
                        organism = synthetic construct
SEQUENCE: 20
gcaagcttgg agtgatcatc gtatgcatat gcgtttctcc tccagatccc tgtttcctgt   60
gtgaaattgt                                                          70

SEQ ID NO: 21           moltype = DNA   length = 35
FEATURE                 Location/Qualifiers
misc_feature            1..35
                        note = PCR primer
source                  1..35
                        mol_type = other DNA
                        organism = synthetic construct
SEQUENCE: 21
ctcgaattca ctggccgtcg ttttacaacg tcgtg                              35

SEQ ID NO: 22           moltype = DNA   length = 35
```

```
FEATURE                    Location/Qualifiers
misc_feature               1..35
                           note = PCR primer
source                     1..35
                           mol_type = other DNA
                           organism = synthetic construct
SEQUENCE: 22
cgcaattgag tttgtagaaa cgcaaaaagg ccatc                               35

SEQ ID NO: 23              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 23
ttacatatga aacaacaagg catgaatcga gtagc                               35

SEQ ID NO: 24              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 24
ttagaattct tattttacat catcaaaata acggg                               35

SEQ ID NO: 25              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 25
ttacatatga aaaacgggag aggaaatcgg gtagc                               35

SEQ ID NO: 26              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 26
ttagaattct tactgagcaa aatagcgcgc caata                               35

SEQ ID NO: 27              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 27
ttacatatga aggtcggcat cgtgggaagc ggcat                               35

SEQ ID NO: 28              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 28
ttagaattcc taaaacccca gggcgaaggc cgcct                               35

SEQ ID NO: 29              moltype = DNA  length = 35
FEATURE                    Location/Qualifiers
misc_feature               1..35
                           note = PCR primer
source                     1..35
                           mol_type = other DNA
                           organism = synthetic construct
SEQUENCE: 29
ttacatatga ggtggcgggc ggacttcctc tcggc                               35
```

```
SEQ ID NO: 30           moltype = DNA  length = 35
FEATURE                 Location/Qualifiers
misc_feature            1..35
                        note = PCR primer
source                  1..35
                        mol_type = other DNA
                        organism = synthetic construct
SEQUENCE: 30
ttagaattct caagcatcgt ccctccaagg cacgc                              35

SEQ ID NO: 31           moltype = DNA  length = 35
FEATURE                 Location/Qualifiers
misc_feature            1..35
                        note = PCR primer
source                  1..35
                        mol_type = other DNA
                        organism = synthetic construct
SEQUENCE: 31
ttacatatgc aaggcattcc tgtgcaacaa ctgcg                              35

SEQ ID NO: 32           moltype = DNA  length = 35
FEATURE                 Location/Qualifiers
misc_feature            1..35
                        note = PCR primer
source                  1..35
                        mol_type = other DNA
                        organism = synthetic construct
SEQUENCE: 32
ttagaattct taaaggccca ccgctttagc ggcct                              35

SEQ ID NO: 33           moltype = DNA  length = 35
FEATURE                 Location/Qualifiers
misc_feature            1..35
                        note = PCR primer
source                  1..35
                        mol_type = other DNA
                        organism = synthetic construct
SEQUENCE: 33
ttacatatga gggttcctta tcccgtactc aagca                              35

SEQ ID NO: 34           moltype = DNA  length = 35
FEATURE                 Location/Qualifiers
misc_feature            1..35
                        note = PCR primer
source                  1..35
                        mol_type = other DNA
                        organism = synthetic construct
SEQUENCE: 34
tttgaattct catcttgtcc ctcctccttg tagat                              35
```

HYDROGENOPHILUS BACTERIUM TRANSFORMANT

A computer readable xml file, entitled "128209-5002-US-01_Sequence_Listing_ST26.xml," created on Dec. 2, 2024, with a file size of 46,922 bytes contains the sequence listing for this application and is hereby incorporated by reference in its entirety.

TECHNICAL FIELD

The present invention relates to a recombinant *Hydrogenophilus* bacterium genetically enhanced to produce elevated amounts of valine, a method of producing valine using the recombinant, and a method of generating the recombinant.

The present invention relates to a *Hydrogenophilus* bacterium transformant harboring the ability to produce lactic acid, and to a method for producing lactic acid using the same.

BACKGROUND ART

The Paris Agreement, which was adopted in 2015, provides that global emissions of greenhouse gases should be promptly reduced. Under the Agreement, Japan set the goal of reducing her emission of greenhouse gases such as carbon dioxide and methane by 26% compared with year 2013 levels, by the year 2030.

Worldwide, the majority of the production of chemicals depends on petroleum resources, exacerbating the problem of increased greenhouse gas emissions. Accordingly, departure from petroleum dependency is a desirable strategy for the production of chemicals, and research and development of biorefineries that produce green chemicals from biomass is being earnestly carried out in various countries. However, the saccharification of biomass for use as raw materials of microbial fermentation necessitates complex processes, beside being costly.

As part of research geared towards departure from petroleum dependency, gases such as carbon dioxide, methane, and carbon monoxide have attracted attention as more sustainable carbon sources, and techniques for producing valuable chemicals and biofuels using microorganisms that utilize these gases are the subject of intense interest. In particular, carbon fixation of carbon dioxide and efficient utilization of carbon dioxide, a significant contributor to global warming, is highly anticipated.

Valine, which is one of the essential amino acids, is a substance that has become useful as, an ingredient of pharmaceuticals, food, or cosmetics, or as a livestock feed additive. Hitherto, valine has been produced either by fermentation or by chemical hydrolysis of proteins.

Nonetheless, the production of valine by fermentation of renewable resources involves an exceedingly large number of metabolic reaction steps, starting with the sugar that serves as raw material, when compared with fermentative production of lactic acid or ethanol. For this and other reasons such as feedback inhibition of metabolic enzymes by the valine product, resultant low productivity poses a persistent impediment to industrial-scale production of valine.

In microbial cells, valine is produced via four steps from pyruvic acid, which is an important intermediate metabolite within living cells. The core process proceeds as follows: acetolactate is produced from pyruvic acid through the catalytic action of acetolactate synthase; 2,3-dihydroxyisovaleric acid is then produced from acetolactate through the catalytic action of ketol acid reductoisomerase; 2-ketoisovaleric acid is then produced from 2,3-dihydroxyisovaleric acid through the catalytic action of dihydroxy acid dehydratase; finally, an amino group is transferred from glutamic acid to 2-ketoisovaleric acid through the catalytic action of branched-chain amino acid aminotransferase to produce valine.

Regarding the acetolactate synthase involved in biosynthesis of valine in *Escherichia coli*, there are three known isozymes, I, II, and III. Acetolactate synthase II is resistant to feedback inhibition by valine, whereas acetolactate synthase I and acetolactate synthase III are susceptible to the feedback inhibition by valine. Accordingly, in order to produce valine through use of microorganisms, it is required that an acetolactate synthase resistant to feedback inhibition by valine be produced at a high level.

The acetolactate synthase enzyme is composed of a large subunit and a small subunit. The large subunit harbors the catalytic function, whereas the small subunit retains the regulatory function. It is due to the function of the small subunit that enzymatic activity of the acetolactate synthase is sensitive to feedback inhibition by valine.

Biodegradable plastics, which are eventually decomposed to water and carbon dioxide by microorganisms in nature, have attracted attention in light of the problems of sea pollution by plastic garbage, etc. Biodegradable plastics are categorized into bacterial products series, natural products series and chemical synthetic series according to method of manufacture. Polylactic acid (lactic acid resin), of which research and practical realization has proceeded the fastest of all biodegradable plastics, is regarded as an intermediate biodegradable plastic between bacterial products series and chemical synthetic series since its raw material is lactic acid, a product of the glycolysis system, an intravital metabolic pathway. That is, polylactic acid is produced by the purification of lactic acid produced by microbial fermentation and chemical polycondensation. Current polylactic acid production uses biomass as a raw material, the conversion of biomass into saccharides requires complicated steps, as aforementioned, and therefore, current polylactic acid production has a problem of a high cost.

Accordingly, a practicable method which is able to produce lactic acid in simpler steps is required. In particular, a practicable method which is able to produce lactic acid by carbon dioxide fixation.

Lactic acid is produced from pyruvic acid, intravital important metabolic product. That is, lactic acid is produced by catalytic activity of lactate dehydrogenase.

As a technology which manufactures lactic acid using a recombinant microorganism, Patent Literature 1 describes a method for producing lactic acid using a transformant obtained by introducing the lactate dehydrogenase gene of *Lactobacillus helvetics* or *Bacillus megaterium* into a yeast strain.

Patent Literature 2 describes a method for producing lactic acid using a transformant obtained by introducing *Lactobacillus pentosus* LDH gene as a lactate dehydrogenase gene into *Schizosaccharomyces pombe*.

Patent Literature 3 describes a method for producing lactic acid using a transformant obtained by introducing *Thermoanaerobacter pseudethanolicus* ldh gene as a lactate dehydrogenase gene into *Moorella thermoacetica*.

Patent Literature 4 describes a method for producing lactic acid using a transformant obtained by introducing

*Lactobacillus delbrueckii* hdhD gene or ldhA gene as a lactate dehydrogenase gene into *Geobacillus thermoglucosidans*.

Non Patent Literature 1 describes a method for producing lactic acid using a transformant obtained by introducing the lactate dehydrogenase gene of *Lactobacillus casei* into *Escherichia coli*.

However, all these methods are methods for producing lactic acid using sugar as a carbon source, and not methods for producing lactic acid using carbon dioxide as a carbon source.

Non Patent Literature 2 describes a method for producing lactic acid using a transformant obtained by introducing the lactate dehydrogenase gene of *Bacillus subtilis* into *Synechocystis* sp. PCC6803 strain. This method is for producing lactic acid using Cyanobacterium, which is a photosynthetic bacterium, as a host and using sodium hydrogen carbonate as a carbon source.

Cyanobacteria have a higher carbon fixation ability of carbon dioxide as compared to that of plants. However, the method of using Cyanobacterium as a host has not been put into practical use as an industrial method for producing lactic acid since carbon dioxide fixation ability of Cyanobacteria is insufficient.

Patent Literature 5 describes a method for producing lactic acid using a transformant obtained by introducing *Thermus thermophilus* ldhA gene as a lactate dehydrogenase gene into *Hydrogenobacter thermophilus*.

*Hydrogenobacter thermophilus* is a hydrogen oxidizing bacterium which grows twofold in 1.5 hours. However, to apply current is necessary in order to produce sufficient amounts of lactic acid, and therefore, the method using *Hydrogenobacter thermophilus* as a host has not been put into practical use as an industrial method for producing lactic acid.

CITATION LIST

Patent Literatures

[Patent Literature 1] JP2005-528106A
[Patent Literature 2] JP2014/030655A1
[Patent Literature 3] JP2015-023854A
[Patent Literature 4] JP2017-523778A
[Patent Literature 5] JP2017-093465A Non Patent Literatures

[Non Patent Literature 1] Homofermentative production of D- or L-lactate in metabolically engineered *Escherichia coli* RR1. Chang D E, Jung H C, Rhee J S, Pan J G. Appl. Environ. Microbiol. (1999) 65:1384-1389

[Non Patent Literature 2] Engineering a cyanobacterial cell factory for production of lactic acid. Angermayr S A, Paszota M, Hellingwerf K J. Appl. Environ. Microbiol. (2012) 78:7098-7106

SUMMARY OF INVENTION

Technical Problem

The objective of the present invention is to provide a *Hydrogenophilus* bacterium recombinant capable of efficiently producing valine through utilization of carbon dioxide as a sole carbon source, and a method of efficiently producing valine using the recombinant.

The objective of the present invention is to provide a transformant of a *Hydrogenophilus* bacterium that is capable of efficiently producing lactic acid utilizing carbon dioxide as a sole carbon source, and a method for efficiently producing lactic acid using this transformant.

Solution to Problem

*Hydrogenophilus* bacteria are hydrogen oxidizing bacteria which grow by producing organic substances from carbon dioxide by utilizing hydrogen energy. The growth rate of hydrogen-oxidizing bacteria is generally extremely slow, however, the growth rate of *Hydrogenophilus* bacteria is fast, and their carbon fixation ability of carbon dioxide is remarkably higher than that of plants and photosynthetic bacteria.

An ilvH gene encoding an acetolactate synthase III small subunit is present on the genome of the *Hydrogenophilus* bacterium. Acetolactate synthase III is subjected to feedback inhibition by valine, and hence, in the present invention, an attempt has been made to introduce a mutation expected to cause desensitization to feedback inhibition by valine into the gene encoding the acetolactate synthase on the genome of the *Hydrogenophilus* bacterium.

As a result, it has been found that a mutant acetolactate synthase III in which, in SEQ ID NO: 1 serving as the amino acid sequence of the acetolactate synthase III small subunit of the *Hydrogenophilus* bacterium, Asn at amino acid No. 11 is substituted by Asp, His, or Ala, Gly at amino acid No. 14 is substituted by Asp or Ala, Ser at amino acid No. 17 is substituted by Phe, Asn at amino acid No. 29 is substituted by Lys, Tyr, Asp, or His, Thr at amino acid No. 34 is substituted by Ile, Ala at amino acid No. 36 is substituted by Val, Arg at amino acid No. 84 and all subsequent amino acids are deleted, or Leu at amino acid No. 131 is substituted by Arg is desensitized to feedback inhibition by valine. That is, growth of a wild-type *Hydrogenophilus* bacterium is inhibited in the presence of 1 mM valine, but growth of a *Hydrogenophilus* bacterium having the above-mentioned mutation introduced into the gene encoding acetolactate synthase III is not inhibited even in the presence of a high concentration of valine, and accumulates valine in a culture liquid. Such a *Hydrogenophilus* bacterium recombinant produces valine more efficiently through use of carbon dioxide as a sole carbon source.

*Hydrogenophilus* bacteria do not have a lactate dehydrogenase gene and a malate/lactate dehydrogenase gene, which are known to encode an enzyme catalyzing the reaction of producing lactic acid from pyrubic acid. In order to provide the bacteria with an ability to produce lactic acid at an industrial scale, there is a need to introduce genes of enzymes that catalyze the reaction of producing lactic acid.

The inventors of the present invention have found that when a heterologous gene is introduced into *Hydrogenophilus* bacteria using a vector that functions within the *Hydrogenophilus* bacteria, a functioning protein often is not produced or is insufficiently produced. Genes which bring about high activity within bacteria other than the genus *Hydrogenophilus* often do not, or insufficiently, bring about activity.

Faced with such a situation, the inventors of the present invention have found that when a lactate dehydrogenase gene and/or a gene encoding a malate/lactate dehydrogenase which has lactate dehydrogenase activity is/are introduced into *Hydrogenophilus* bacteria, the gene(s) function(s) and bring(s) about high activity within the *Hydrogenophilus* bacteria.

The inventors of the present invention have also found that a transformant obtained by introducing a lactate dehydrogenase gene and/or a malate/lactate dehydrogenase gene into a *Hydrogenophilus* bacterium, efficiently produces lactic acid using carbon dioxide as a sole carbon source.

Further, the inventors of the present invention have found that ldh gene of *Parageobacillus thermoglucosidasius*, *Geobacillus kaustophilus* or *Thermus thermophilus* of the lactate dehydrogenase genes and mldh gene of *Thermus thermophilus* and mldh-1 and mldh-2 genes of *Meiothermus ruber* of the malate/lactate dehydrogenase genes bring about higher enzymatic activity expression especially in *Hydrogenophilus* bacteria.

The present invention has been completed based on the above-mentioned findings, and provides the following mutant acetolactate synthase III small subunit genes, and transformants and methods for producing valine or lactic acid.

Item 1. A mutant acetolactate synthase III small subunit gene of following (4) or (5):
 (4) a gene formed of a mutant base sequence having a mutation of any one of the following (i) to (p) in a base sequence set forth in SEQ ID NO: 2:
  (i) a substitution of AAC at base Nos. 31 to 33 with GAT, GAC, CAT, CAC, GCT, GCC, GCA, or GCG;
  (j) a substitution of GGC at base Nos. 40 to 42 with GAT, GAC, GCT, GCC, GCA, or GCG;
  (k) a substitution of TCG at base Nos. 49 to 51 with TTT or TTC;
  (l) a substitution of AAC at base Nos. 85 to 87 with AAA, AAG, TAT, TAC, GAT, GAC, CAT, or CAC;
  (m) a substitution of ACC at base Nos. 100 to 102 with ATT, ATC, or ATA;
  (n) a substitution of GCA at base Nos. 106 to 108 with GTT, GTC, GTA, or GTG;
  (o) a substitution of CGC at base Nos. 250 to 252 with TAA, TAG, or TGA; and
  (p) a substitution of CTC at base Nos. 391 to 393 with CGT, CGC, CGA, CGG, AGA, or AGG;
 (5) a gene formed of a base sequence having 90% or more identity to the mutant base sequence described in (4), the gene encoding a mutant acetolactate synthase III small subunit that has acetolactate synthase III small subunit activity and is suppressed in feedback inhibition by valine,
 provided that
  when the mutant base sequence has the mutation of (i), the bases at base Nos. 31 to 33 are GAT, GAC, CAT, CAC, GCT, GCC, GCA, or GCG,
  when the mutant base sequence has the mutation of (j), the bases at base Nos. 40 to 42 are GAT, GAC, GCT, GCC, GCA, or GCG,
  when the mutant base sequence has the mutation of (k), the bases at base Nos. 49 to 51 are TTT or TTC,
  when the mutant base sequence has the mutation of (l), the bases at base Nos. 85 to 87 are AAA, AAG, TAT, TAC, GAT, GAC, CAT, or CAC,
  when the mutant base sequence has the mutation of (m), the bases at base Nos. 100 to 102 are ATT, ATC, or ATA,
  when the mutant base sequence has the mutation of (n), the bases at base Nos. 106 to 108 are GTT, GTC, GTA, or GTG,
  when the mutant base sequence has the mutation of (o), the bases at base Nos. 250 to 252 are TAA, TAG, or TGA, and
  when the mutant base sequence has the mutation of (p), the bases at base Nos. 391 to 393 are CGT, CGC, CGA, CGG, AGA, or AGG.

Item 2. A *Hydrogenophilus* bacterium, including the mutant acetolactate synthase III small subunit gene of Item 1.

Item 3. A method of producing valine, including a step of culturing the *Hydrogenophilus* bacterium of Item 2 through use of carbon dioxide as a substantially sole carbon source.

Aspect 1. A transformant obtained by introducing (a) a lactate dehydrogenase gene and/or (b) a malate/lactate dehydrogenase gene into a *Hydrogenophilus* bacterium.

Aspect 2. The transformant according to aspect 1, wherein (a) the lactate dehydrogenase gene is the following DNA (a1), (a2), (a3), (a4), (a5) or (a6):
 (a1) DNA which consists of a base sequence of SEQ ID NO: 1, 2 or 3;
 (a2) DNA which consists of a base sequence having 90% or more identity to SEQ ID NO: 1, 2 or 3, the DNA encoding a polypeptide having lactate dehydrogenase activity;
 (a3) DNA which hybridizes with a DNA consisting of a base sequence complementary to SEQ ID NO: 1, 2 or 3 under stringent conditions, and which encodes a polypeptide having lactate dehydrogenase activity;
 (a4) DNA which encodes a polypeptide consisting of an amino acid sequence of SEQ ID NO: 4, 5 or 6;
 (a5) DNA which encodes a polypeptide consisting of an amino acid sequence having 90% or more identity to SEQ ID NO: 4, 5 or 6, the polypeptide having lactate dehydrogenase activity;
 (a6) DNA which encodes a polypeptide consisting of an amino acid sequence having a deletion, substitution, or addition of one or a plurality of amino acids in an amino acid sequence of SEQ ID NO: 4, 5 or 6, the polypeptide having lactate dehydrogenase activity.

Aspect 3. The transformant according to aspect 1 or 2, wherein (b) the malate/lactate dehydrogenase gene is the following DNA (b1), (b2), (b3), (b4), (b5) or (b6):
 (b1) DNA which consists of a base sequence of SEQ ID NO: 7, 8 or 9;
 (b2) DNA which consists of a base sequence having 90% or more identity to SEQ ID NO: 7, 8 or 9, the DNA encoding a polypeptide having lactate dehydrogenase activity;
 (b3) DNA which hybridizes with a DNA consisting of a base sequence complementary to SEQ ID NO: 7, 8 or 9 under stringent conditions, and which encodes a polypeptide having lactate dehydrogenase activity;
 (b4) DNA which encodes a polypeptide consisting of an amino acid sequence of SEQ ID NO: 10, 11 or 12;
 (b5) DNA which encodes a polypeptide consisting of an amino acid sequence having 90% or more identity to SEQ ID NO: 10, 11 or 12, the polypeptide having lactate dehydrogenase activity;
 (b6) DNA which encodes a polypeptide consisting of an amino acid sequence having a deletion, substitution, or addition of one or a plurality of amino acids in the amino acid sequence of SEQ ID NO: 10, 11 or 12, the polypeptide having lactate dehydrogenase activity.

Aspect 4. The transformant according to any one of aspects 1-3, wherein the *Hydrogenophilus* bacterium is *Hydrogenophilus thermoluteolus*.

Aspect 5. A method for producing lactic acid comprising a step of culturing the transformant according to any one of aspects 1-4 through use carbon dioxide as a substantially sole carbon source.

Advantageous Effects of Invention

Measures to counter the increase in atmospheric carbon dioxide entail reduction of carbon dioxide emissions and fixation of emitted carbon dioxide. In order to reduce carbon dioxide emissions, solar, wind, geothermal, and similar energies are utilized in place of fossil energy. However, the utilization of such energies is not yet extensive enough to repress the buildup of atmospheric carbon dioxide. Consequently, there is need to enhance atmospheric carbon fixation or recycling of emitted carbon dioxide.

Carbon fixation of carbon dioxide can occur physically or chemically, but fixation utilizing living cells, avails organic substances that can consequently be utilized as food, feed, and fuel. In so doing, carbon dioxide itself becomes a resource that can be directly converted into valuable chemical products.

Accordingly, the twin problems of global warming due to increased atmospheric carbon dioxide and scarcity of food, feed, and fuel can be solved. Further, in-demand chemical products can be produced while suppressing global warming attributed to increased carbon dioxide emissions.

The *Hydrogenophilus* bacterium produces valine in an amount required for survival, but does not produce valine in an industrially applicable amount. The recombinant of the present invention has a mutation introduced into a valine production-associated gene on the genome of the *Hydrogenophilus* bacterium, and consequently, can efficiently produce valine.

As described above, the *Hydrogenophilus* bacterium has a particularly excellent carbon fixation ability of carbon dioxide among organisms having the carbon fixation ability of carbon dioxide. Accordingly, the use of the recombinant of the present invention enables production of valine through fixation of carbon from carbon dioxide on an industrial scale.

Biodegradable plastics of chemical products attract attention for their environmental benefits. Biodegradable plastics produced by fixation of carbon dioxide are decomposed to water and carbon dioxide by microorganisms in the environment. That is, biodegradable plastics are carbon-neutral, and are able to solve global warming attributed to increased carbon dioxide emissions, difficulty in securing plastic products necessary for life, and environmental problems such as sea pollution, together.

Hydrogen-oxidizing bacteria can grow by utilizing the chemical energy generated by the reaction of hydrogen with oxygen and by using carbon dioxide as a sole carbon source. Since hydrogen-oxidizing bacteria can produce chemical products from a mixture of oxygen, hydrogen, and carbon dioxide gases as raw material, the cells can efficiently assimilate carbon from carbon dioxide and be cultured in a simple culture medium. Growth of typical hydrogen-oxidizing bacteria is generally slow, but that of *Hydrogenophilus* bacteria is exceptionally high. The Journal of Mitsubishi Research Institute No. 34 1999 describes *Hydrogenophilus* bacteria as follows: "Their proliferative capacity is so high that their carbon fixation ability of carbon dioxide cannot be compared with that of plants, which truly indicates the high carbon dioxide fixation ability of microorganisms".

When a heterologous gene is introduced into *Hydrogenophilus* bacteria using a vector that functions within the *Hydrogenophilus* bacteria, a functioning protein is often not produced. Regardless, according to the present invention, by introducing lactate dehydrogenase gene and/or malate/lactate dehydrogenase gene into of *Hydrogenophilus* bacteria, the genes functioned within the *Hydrogenophilus* bacteria, and lactic acid could be produced.

As described above, *Hydrogenophilus* bacteria have a atypically remarkable carbon fixation ability of carbon dioxide among organisms having carbon dioxide fixation ability, and therefore, by using the transformant of the present invention, carbon derived from carbon dioxide can be fixed and lactic acid can be produced at an industrial level. Since lactic acid is used as a raw material for producing polylactic acid, which is a typical biodegradable plastic, the present invention has opened the way to producing polylactic acid industrially.

MODE FOR CARRYING OUT THE INVENTION

The present invention is described in detail below:
(1) *Hydrogenophilus* Bacterium Recombinant An example of the *Hydrogenophilus* bacterium recombinant of the present invention is a *Hydrogenophilus* bacterium recombinant having a mutant acetolactate synthase III small subunit gene of following (4) or (5) on the genome thereof.

A particular example thereof is a *Hydrogenophilus* bacterium recombinant in which the naturally occurring acetolactate synthase III small subunit gene on the genome has been substituted with the mutant acetolactate synthase III small subunit gene of following (4) or (5).

(4) A gene formed of a mutant base sequence having a mutation of any one of the following (i) to (p) in a base sequence set forth in SEQ ID NO: 2:
   (i) a substitution of AAC at base Nos. 31 to 33 with GAT, GAC, CAT, CAC, GCT, GCC, GCA, or GCG;
   (j) a substitution of GGC at base Nos. 40 to 42 with GAT, GAC, GCT, GCC, GCA, or GCG;
   (k) a substitution of TCG at base Nos. 49 to 51 with TTT or TTC;
   (l) a substitution of AAC at base Nos. 85 to 87 with AAA, AAG, TAT, TAC, GAT, GAC, CAT, or CAC;
   (m) a substitution of ACC at base Nos. 100 to 102 with ATT, ATC, or ATA;
   (n) a substitution of GCA at base Nos. 106 to 108 with GTT, GTC, GTA, or GTG;
   (o) a substitution of CGC at base Nos. 250 to 252 with TAA, TAG, or TGA; and
   (p) a substitution of CTC at base Nos. 391 to 393 with CGT, CGC, CGA, CGG, AGA, or AGG.

SEQ ID NO: 2 sets forth the base sequence of the naturally occurring acetolactate synthase III small subunit gene of *Hydrogenophilus thermoluteolus*.

(5) A gene formed of a base sequence having 90% or more, preferably 95% or more, more preferably 98% or more, still more preferably 99% or more identity to the mutant base sequence described in (4), the gene encoding a mutant acetolactate synthase III small subunit that has acetolactate synthase III small subunit activity and is suppressed in feedback inhibition by valine,
  provided that
    when the mutant base sequence has the mutation of (i), the bases at base Nos. 31 to 33 are GAT, GAC, CAT, CAC, GCT, GCC, GCA, or GCG,
    when the mutant base sequence has the mutation of (j), the bases at base Nos. 40 to 42 are GAT, GAC, GCT, GCC, GCA, or GCG,
    when the mutant base sequence has the mutation of (k), the bases at base Nos. 49 to 51 are TTT or TTC, when the mutant base sequence has the mutation of (1), the bases at base Nos. 85 to 87 are AAA, AAG, TAT, TAC, GAT, GAC, CAT, or CAC, when the mutant base sequence has the mutation of (m), the bases at base Nos. 100 to 102 are ATT, ATC, or ATA, when the mutant base sequence has the mutation of (n), the bases at base Nos. 106 to 108 are GTT, GTC, GTA, or GTG, when the mutant base sequence has the mutation of (o), the bases at base Nos. 250 to 252 are TAA, TAG, or TGA, and when the mutant base sequence has the mutation of (p), the bases at base Nos. 391 to 393 are CGT, CGC, CGA, CGG, AGA, or AGG.

(2) Transformant Having Lactic Acid Producing Ability

The present invention encompasses a transformant obtained by introducing lactate dehydrogenase gene and/or malate/lactate dehydrogenase gene into a host bacterium of *Hydrogenophilus*. In other words, this transformant possesses exogenous lactate dehydrogenase gene and/or malate/lactate dehydrogenase gene. Malate/lactate dehydrogenase is an enzyme having the activity of lactate dehydrogenase.

Lactate dehydrogenase gene or malate/lactate dehydrogenase gene can be introduced, alternatively, lactate dehydrogenase gene and malate/lactate dehydrogenase gene can be introduced. Further, two or more kinds of lactate dehydrogenase genes and/or two or more kinds of malate/lactate dehydrogenase genes can be introduced.

*Hydrogenophilus* bacteria do not produce lactic acid in an amount that can be utilized industrially. When a lactate dehydrogenase gene and/or malate/lactate dehydrogenase gene of a heterogenous microorganism is introduced into *Hydrogenophilus* bacteria, the gene(s) function(s) within the *Hydrogenophilus* bacteria, and a highly active lactate dehydrogenase and/or malate/lactate dehydrogenase is/are produced, and therefore, the obtained transformants efficiently produce lactic acid using carbon dioxide as a sole carbon source.

Transgene

Examples of the lactate dehydrogenase gene include *Parageobacillus thermoglucosidasius* ldh gene, *Geobacillus kaustophilus* ldh gene and *Thermus thermophilus* ldh gene, which are preferable in that they have good lactic acid production efficiency. The base sequence of *Parageobacillus thermoglucosidasius* ldh gene is SEQ ID NO: 1, the base sequence of *Geobacillus kaustophilus* ldh gene is SEQ ID NO: 2 and base sequence of *Thermus thermophilus* ldh gene is SEQ ID NO: 3.

DNA which consists of a base sequence having 90% or more, particularly 95% or more, more particularly 98% or more, furthermore particularly 99% or more identity to SEQ ID NO: 1, 2 or 3, the DNA encoding a polypeptide having lactate dehydrogenase activity, can also be used preferably.

In the present invention, the identities of base sequences were calculated using GENETYX ver.17 (made by GENETYX Corporation).

DNA which hybridizes with a DNA consisting of a base sequence complementary to SEQ ID NO: 1, 2 or 3 under stringent conditions, the DNA encoding a polypeptide having lactate dehydrogenase activity, can also be used preferably.

In the present invention, "stringent conditions" means hybridization with 6×SSC solution at temperatures from 50 to 60° C. for 16 hours, followed by washing with 0.1×SSC solution.

In addition, DNA which encodes a polypeptide consisting of an amino acid sequence of SEQ ID NO: 4, 5 or 6 is also used preferably. SEQ ID NO: 4 is the amino acid sequence of *Parageobacillus thermoglucosidasius* lactate dehydrogenase, SEQ ID NO: 5 is the amino acid sequence of *Geobacillus kaustophilus* lactate dehydrogenase, and SEQ ID NO: 6 is the amino acid sequence of *Thermus thermophilus* lactate dehydrogenase.

Further, DNA which encodes a polypeptide consisting of an amino acid sequence having 90% or more, preferably 95% or more, more preferably 98% or more, even more preferably 99% or more identity to SEQ ID NO: 4, 5 or 6, the polypeptide having lactate dehydrogenase activity can also be used.

In the present invention, the identities of amino acid sequences were calculated using GENETYX ver.17 (made by GENETYX Corporation).

DNA which encodes a polypeptide consisting of an amino acid sequence having a deletion, substitution, or addition of one or a plurality of amino acids in the amino acid sequence of SEQ ID NO: 4, 5 or 6, the polypeptide having lactate dehydrogenase activity can also be used preferably.

In the present invention, examples of plurality include 1 to 5, in particular 1 to 3, in particular 1 to 2, and particularly 1.

Examples of the malate/lactate dehydrogenase gene include *Thermus thermophilus* mldh gene and *Meiothermus ruber* mldh-1 and mldh-2 genes, which are preferable in that they have good lactic acid production efficiency. The base sequence of *Thermus thermophilus* mldh gene is SEQ ID NO: 7, the base sequence of *Meiothermus ruber* mldh-1 gene is SEQ ID NO: 8 and the base sequence of *Meiothermus ruber* mldh-2 gene is SEQ ID NO: 9.

DNA which consists of a base sequence having 90% or more, particularly 95% or more, more particularly 98% or more, further more particularly 99% or more identity to SEQ ID NO: 7, 8 or 9, the DNA encoding a polypeptide having lactate dehydrogenase activity, and DNA which hybridizes with a DNA consisting of a base sequence complementary to SEQ ID NO: 7, 8 or 9 under stringent conditions, the DNA encoding a polypeptide having lactate dehydrogenase activity, can also be used preferably.

In addition, DNA which encodes a polypeptide consisting of an amino acid sequence of SEQ ID NO: 10, 11 or 12 is also used preferably. SEQ ID NO: 10 is the amino acid sequence which is encoded by *Thermus thermophilus* malate/lactate dehydrogenase (Mldh) gene, SEQ ID NO: 11 is the amino acid sequence which is encoded by *Meiothermus ruber* malate/lactate dehydrogenase (Mldh-1) gene, and SEQ ID NO: 12 is the amino acid sequence which is encoded by *Meiothermus ruber* malate/lactate dehydrogenase (Mldh-2) gene.

Further, DNA which encodes a polypeptide consisting of an amino acid sequence having 90% or more, particularly 95% or more, more particularly 98% or more, further more particularly 99% or more identity to SEQ ID NO: 10, 11 or 12, the polypeptide having lactate dehydrogenase activity, and DNA which encodes a polypeptide consisting of an amino acid sequence having a deletion, substitution, or addition of one or a plurality of amino acids in the amino acid sequence of SEQ ID NO: 10, 11 or 12, the polypeptide having lactate dehydrogenase activity can also be used preferably.

In the present invention, in order to verify that a polypeptide to be tested has a lactate dehydrogenase activity, the polypeptide is reacted with pyruvic acid under the coexistence of NADH, and decrease in absorbance at 340 nm is detected. Lactate dehydrogenase produces lactic acid from pyruvic acid. Lactate dehydrogenase consumes NADH when lactic acid is produced from pyruvic acid, and thus decrease in the amount of NADH is detected using decrease in absorbance at 340 nm as an index. Specifically, the method described in item "Examples" is carried out. If the polypeptide to be tested reduces absorbance at 340 nm even by a slight degree, the polypeptide is determined to have lactate dehydrogenase activity.

(3) Methods for Producing Transformants

Next, methods for obtaining transformants by introducing the above-described genes for the production of lactic acid into *Hydrogenophilus* bacteria are described.

Host

Examples of *Hydrogenophilus* bacteria include *Hydrogenophilus thermoluteolus, Hydrogenophilus halorhabdus, Hydrogenophilus denitrificans, Hydrogenophilus hirschii, Hydrogenophilus islandicus*, and strain Mar3 of the genus *Hydrogenophilus* (*Hydrogenophilus* sp. Mar3). In particular, *Hydrogenophilus thermoluteolus* is preferable because its superior growth rate enables top-level carbon fixation from carbon dioxide among carbon dioxide fixing microorganisms.

*Hydrogenophilus* bacteria have been easily isolated from diverse regions everywhere on the earth. A preferable strain of *Hydrogenophilus thermoluteolus* is strain TH-1 (NBRC 14978). *Hydrogenophilus thermoluteolus* strain TH-1 (NBRC 14978) exhibits comparatively rapid growth rate among carbon dioxide fixing microorganisms (Agricultural and Biological Chemistry, 41, 685-690 (1977)). *Hydrogenophilus thermoluteolus* strain NBRC 14978 is internationally deposited under the Budapest Treaty, and is thus available to the general public.

Transformation

Plasmid vectors for introducing the above-described DNAs into a host should contain a DNA which controls the autonomous replication function within *Hydrogenophilus* bacteria, and examples include broad-host-range vectors pRK415 (GenBank: EF437940.1), pBHR1 (GenBank: Y14439.1), pMMB67EH (ATCC 37622), pCAR1 (NCBI Reference Sequence: NC_004444.1), pC194 (NCBI Reference Sequence: NC_002013.1), pK18mobsacB (GenBank: FJ437239.1), pUB110 (NCBI Reference Sequence: NC 001384.1), and the like.

Examples of preferable promoters include tac promoter, lac promoter, trc promoter, or each of promoters OXB1 and OXB11 to OXB20 from Oxford Genetics Ltd. Examples of preferable terminators include the T1T2 terminator of *Escherichia coli* rRNA operon rrnB, the t0 transcription terminator of bacteriophage A, and the like.

Transformation can be carried out by publicly known methods such as calcium chloride method, calcium phosphate method, DEAE-dextran transfection method, and electric pulse method.

*Hydrogenophilus* bacteria grow under autotrophic conditions. However, since they can grow under heterotrophic conditions as well, the culture medium which is used to culture a host or *Hydrogenophilus* bacterium recombinant can either be an inorganic culture medium or an organic culture medium. An organic culture medium comprising sugar, organic acids, amino acid, and the like can be used. The pH of the culture medium can be adjusted to approximately 6.2 to 8.

In any of the cases, culture can be carried out while supplying a mixture of gases containing hydrogen, oxygen, and carbon dioxide, and preferably a mixture of gases consisting of hydrogen, oxygen, and carbon dioxide. When using an organic culture medium, a mixture of gases containing hydrogen, oxygen, and carbon dioxide, for example air, can be used for aeration. When carbon dioxide gas is not supplied, a culture medium containing a carbonate as a carbon source can be used. Mixed gases can be entrapped within or continuously supplied into an airtight culture container, and can be dissolved into the culture medium by means of shaking culture. Alternatively, the culture container can be an airtight or open type, and mixed gases can be dissolved into the culture medium by bubbling.

The volume ratio of hydrogen, oxygen, and carbon dioxide within the supplied gas (hydrogen: oxygen: carbon dioxide) is preferably 1.75 to 7.5:1:0.25 to 3, more preferably 5 to 7.5:1:1 to 2, and furthermore preferably 6.25 to 7.5:1:1.5. *Hydrogenophilus* bacteria are thermophilic bacteria, and thus the culture temperature is preferably 35 to 55° C., more preferably 37 to 52° C., and even more preferably 50 to 52° C.

(4) Method for Producing Lactic Acid

When producing lactic using the transformant of a *Hydrogenophilus* bacterium described above, the transformant can be cultured using an inorganic or organic culture medium while supplying a mixture of gases containing hydrogen, oxygen, and carbon dioxide.

The supplied gas is preferably a mixture of gases consisting of hydrogen, oxygen, and carbon dioxide. However, different kinds of gases can be mixed within, to the extent that lactic acid can be produced efficiently.

*Hydrogenophilus* bacteria can grow using hydrogen as a source of energy and using carbon dioxide as a sole carbon source, and thus, carbon dioxide can be fixed efficiently particularly by producing the above-described compounds by using substantially only carbon dioxide (in particular, by using only carbon dioxide) as a carbon source. Therefore, using an inorganic culture medium that does not contain carbon sources such as organic substances and carbonates, namely, carrying out culture using substantially only carbon dioxide (in particular, using only carbon dioxide) as a carbon source is preferable. "Using substantially only carbon dioxide as a carbon source" encompasses cases in which an unavoidable amount of other carbon sources is mixed within. Furthermore, a culture medium containing organic substances such as sugar, organic acids, and amino acids, as well as carbonates, can also be used without supplying carbon dioxide.

The pH of the culture medium is preferably 6.2 to 8, more preferably 6.4 to 7.4, and furthermore preferably 6.6 to 7. When the pH is within this range, bacteria grow well and mixed gas dissolves well into the culture medium, and lactic acid can be produced efficiently.

When batch culture is utilized, mixed gases can be entrapped within an airtight culture container and static culture or shaking culture can be carried out. When continuous culture is utilized, mixed gases can be continuously supplied into an airtight culture container and shaking culture can be carried out, or the transformant can be cultured using an airtight culture container while introducing mixed gases into the culture medium by bubbling. Shaking culture is preferable in that better dissolution of mixed gases into the culture medium can be achieved.

The volume ratio of hydrogen, oxygen, and carbon dioxide (hydrogen:oxygen:carbon dioxide) in the supplied gas mixture is preferably 1.75 to 7.5:1:0.25 to 3, more preferably 5 to 7.5:1:1 to 2, and even more preferably 6.25 to 7.5:1:1.5. When the volume ratio is within this range, bacteria grow well, and the target compound can be produced efficiently.

The supply rate of mixed gases or raw material gases can be 10.5 to 60 L/hour, in particular 10.5 to 40 L/hour, in particular 10.5 to 21 L/hour, per 1 L of culture medium. When the supply rate is within this range, transformants grow well and the target compound can be produced efficiently, and the amount of wasted mixed gases can be reduced.

The culture temperature is preferably 35 to 55° C., more preferably 37 to 52° C., and even more preferably 50 to 52° C. When the temperature is within this range, transformants grow well, and lactic acid can be produced efficiently.

The target compound lactic acid is produced in the reaction solution by culturing in the above-described manner. Collecting the reaction solution will enable the recovery of lactic acid, however, lactic acid can furthermore be separated from the reaction solution by publicly known methods. Such publicly known methods include precipitation method, fractional distillation and electrodialysis.

EXAMPLES (1) Construction of a Plasmid Vector

The method for constructing a plasmid vector that was commonly used to introduce genes for conferring lactic acid producing ability is described below.

First, a broad-host-range vector pRK415 (GenBank: EF437940.1) (Gene, 70, 191-197 (1998)) was used as a template and PCR was performed. In order to amplify the DNA fragment of the plasmid region excluding a tetracycline gene region, a primer pair described below was synthesized and used. PCR was performed according to a conventional method using "DNA thermal cycler" manufactured by Life Technologies Inc., and using KOD FX Neo (manufactured by Toyobo Co., Ltd.) as a reaction reagent.
Primers for the Amplification of pRK415 Plasmid Sequence (a-1)
(SEQ ID NO: 13)
5'-CGTGGCCAACTAGGCCCAGCCAGATACTCCCGATC-3'

(b-1)
(SEQ ID NO: 14)
5'-TGAGGCCTCATTGGCCGGAGCGCAACCCACTCACT-3'

A SfiI restriction site has been added to primers (a-1) and (b-1).

Plasmid pK18mobsacB (GenBank: FJ437239.1) (Gene, 145, 69-73 (1994)), which contains a neomycin/kanamycin resistance gene (hereinafter, the gene may be referred to as "nptII"), was used as a template and PCR was performed according to a conventional method. In the PCR, a primer pair described below was synthesized and used in order to amplify the DNA fragment containing the nptII gene sequence. PCR was performed according to a conventional method using "DNA thermal cycler" manufactured by Life Technologies Inc., and using KOD FX Neo (manufactured by Toyobo Co., Ltd.) as a reaction reagent.
Primers for the Amplification of nptII Gene Sequence (a-2)
(SEQ ID NO: 15)
5'-ctgGGCCTAGTTGGCCacgtagaaagccagtccgc-3'

(b-2)
(SEQ ID NO: 16)
5'-tccGGCCAATGAGGCCtcagaagaactcgtcaaga-3'

A SfiI restriction site has been added to primers (a-2) and (b-2).

The reaction solutions that were produced by each of the above-described PCR were subjected to electrophoresis using a 1% agarose gel, and as a result, a DNA fragment of approximately 8.7-kb was detected when pRK415 plasmid was used as a template, and a DNA fragment of approximately 1.1-kb was detected when nptII gene was used as a template.

Thus prepared DNA fragments were each cleaved by restriction enzyme SfiI, and reacted with a T4 DNA Ligase (manufactured by Takara Bio Inc.) to obtain a ligation solution. The obtained ligation solution was used to transform Escherichia coli JM109 by calcium chloride method (Journal of Molecular Biology, 53, 159-162 (1970)), and the transformants were applied onto LB agar media containing 50 μg/mL kanamycin. Viable strains on the culture media were cultured in a liquid culture medium by a conventional method, and plasmid DNA was extracted from the obtained culture solution. This plasmid DNA was cleaved by using restriction enzyme SfiI, and the inserted fragment was confirmed. As a result, a DNA fragment of the nptII gene sequence which was approximately 1.1-kb was observed in addition to DNA fragments of approximately 2.0-kb, 3.0-kb and 3.7-kb, which were derived from the pRK415 plasmid.

The constructed plasmid was named pCYK01.

(2) Construction of Cloning Vector Used for Gene Expression (2-1) Preparation of DNA Fragment of λ t0 Terminator Sequence A primer pair described below was synthesized and used in PCR in order to prepare a DNA having λ t0 terminator sequence. PCR was performed using "DNA thermal cycler" manufactured by Life Technologies Inc., and using KOD FX Neo (manufactured by Toyobo Co., Ltd.) as a reaction reagent. No template DNA was included since extension was carried out using each primer as the other's template.
Primers for the Preparation of λ t0 Terminator Sequence (a-3)
(SEQ ID NO: 17)
5'-GCATTAATccttggactcctgttgatagatccagtaatgacctcag
aactccatctggatttgttcagaacgctcggttgccg-3'

(b-3)
(SEQ ID NO: 18)
5'-caccgtgcagtcgatgGATctggattctcaccaataaaaaacgccc
ggcggcaaccgagcgttctgaacaaatccagatggag-3'

The base sequences of the 3' ends of primers (a-3) and (b-3) are complementary to each other.

The produced reaction solution was subjected to electrophoresis using a 1% agarose gel, and as a result, a DNA fragment of approximately 0.13-kb, which corresponds to the λ t0 terminator sequence, was detected.

(2-2) Preparation of a DNA Fragment of Tac Promoter Sequence

PCR was performed using plasmid pMAL-c5X (manufactured by New England Biolabs Inc.) containing a tac promoter, as a template. In the PCR, a primer pair described below was synthesized and used in order to amplify tac promoter sequence. PCR was performed according to a conventional method using "DNA thermal cycler" manufactured by Life Technologies Inc., and using KOD FX Neo (manufactured by Toyobo Co., Ltd.) as a reaction reagent.
Primers for the Amplification of Tac Promoter Sequence (a-4)

(SEQ ID NO: 19)
5'-TTATTGGTGAGAATCCAGATCCATCGACTGCACGGTGCACCAATGCTTCT-3'

(b-4)

(SEQ ID NO: 20)
5'-gcaagcttggagtgatcatcgtATGCATATGCGTTTCTCCTCCAGATCCctgtttcctgtgtgaaattgt-3'

The produced reaction solution was subjected to electrophoresis using a 1% agarose gel, and as a result, a DNA fragment of approximately 0.3-kb, which corresponds to tac promoter sequence, was detected.

(2-3) Introduction of λ t0 Terminator and Tac Promoter Sequences

The DNA fragments that were prepared in the above-described (2-1) and (2-2) were cut out from the agarose gel, and DNA was recovered from the gel by freezing and melting the gel. The recovered DNA fragments corresponding to λ t0 terminator sequence and the tac promoter sequence were mixed and used as templates, and overlap extension PCR was performed. In the overlap extension PCR, a combination of the above-described primers (a-3) and (b-4) was used in order to prepare a DNA in which the tac promoter is linked downstream of λt0 terminator. The base sequences of the 5' ends of the primers (b-3) and (a-4), which were used in amplifying the template DNA fragments, are complementary with each other. PshBI and HindIII restriction sites have been added to primers (a-3) and (b-4), respectively.

The produced reaction solution was subjected to electrophoresis using a 1% agarose gel, and as a result, a DNA fragment of approximately 0.4-kb, which corresponds to the DNA in which the tac promoter is linked downstream of λ t0 terminator, was detected.

The approximately 0.4-kb DNA fragment that was amplified by PCR, in which the tac promoter is linked downstream of the λ t0 terminator, and the above-mentioned approximately 9.8-kb DNA fragment of cloning vector pCYK01, were cleaved by the restriction enzymes PshBI and HindIII. The cleaved DNA fragments were linked to each other using a T4 DNA Ligase (manufactured by Takara Bio Inc.).

The obtained ligation solution was used to transform *Escherichia coli* JM109 by calcium chloride method, and the transformants were applied onto LB agar media containing 50 µg/mL kanamycin. Viable strains on the culture media were cultured in a liquid culture medium by a conventional method, and plasmid DNA was extracted from the obtained culture solution. This plasmid DNA was cleaved by using restriction enzymes PshBI and HindIII, and the inserted fragment was confirmed. As a result, a DNA fragment of approximately 0.4-kb, in which tac promoter is linked downstream of λ t0 terminator, was observed in addition to a DNA fragment of approximately 9.6-kb from plasmid pCYK01.

(2-4) Introduction of rrnB T1T2 Bidirectional Terminator (Hereinafter, May be Referred to as "rrnB Terminator")

PCR was performed using plasmid pMAL-c5X (manufactured by New England Biolabs Inc.) containing rrnB terminator sequence as a template. In the PCR, a primer pair described below was synthesized and used in order to amplify rrnB terminator sequence. PCR was performed according to a conventional method using "DNA thermal cycler" manufactured by Life Technologies Inc., and using KOD FX Neo (manufactured by Toyobo Co., Ltd.) as a reaction reagent.

Primers for the Amplification of rrnB Terminator Sequence (a-5)

(SEQ ID NO: 21)
5'-ctcgaattcactggccgtcgttttacaacgtcgtg-3'

(b-5)

(SEQ ID NO: 22)
5'-CGCAATTGAGTTTGTAGAAACGCAAAAAGGCCATC-3'

EcoRI and MunI restriction sites have been added to primers (a-5) and (b-5), respectively.

The produced reaction solution was subjected to electrophoresis using a 1% agarose gel, and as a result, a DNA fragment of approximately 0.6-kb, which corresponds to rrnB terminator sequence, was detected.

The approximately 0.6-kb DNA fragment containing rrnB terminator sequence, which was amplified by the above-described PCR, was cleaved by restriction enzymes EcoRI and MunI, and the approximately 10.0-kb DNA fragment of the plasmid that was constructed in the above-described (2-3) was cleaved using restriction enzyme EcoRI. The cleaved DNA fragments were linked to each other using a T4 DNA Ligase (manufactured by Takara Bio Inc.).

The obtained ligation solution was used to transform *Escherichia coli* JM109 by calcium chloride method, and the obtained transformants were applied onto LB agar media containing 50 µg/mL kanamycin. Viable strains on the culture media were cultured in a liquid culture medium by a conventional method, and plasmid DNA was extracted from the obtained culture solution. This plasmid was cleaved by using restriction enzymes EcoRI and MunI, and the inserted fragment was confirmed. As a result, a DNA fragment of approximately 0.6-kb which corresponds to rrnB terminator sequence was observed in addition to a DNA fragment of approximately 10.0-kb from the above-described plasmid of (2-3).

The constructed cloning vector for gene expression was named pCYK21.

(3) Transformant Capable of Producing Lactic Acid (3-1) Cloning of Lactate Dehydrogenase Gene Genomic DNAs were extracted from *Parageobacillus thermoglucosidasius* NBRC 107763, *Geobacillus kaustophilus* NBRC 102445, and *Meiothermus ruber* NBRC 106122 according to a conventional method. Genomic DNA of *Thermus thermophilus* HB8 strain (ATCC 27634) was purchased from Takara Bio Inc.

The four genomic DNAs described above were each used as templates to amplify a DNA fragment containing lactate dehydrogenase ldh gene of each of *Parageobacillus thermoglucosidasius, Geobacillus kaustophilus* and *Thermus thermophilus* and a DNA fragment containing malate/lactate dehydrogenase mldh gene of each of *Thermus thermophilus* and *Meiothermus ruber*, respectively, by PCR method. The following primers were used for PCR. PCR was performed according to a conventional method using "DNA thermal cycler" manufactured by Life Technologies Inc., and using KOD FX Neo (manufactured by Toyobo Co., Ltd.) as a reaction reagent.

Primers for the Amplification of *Parageobacillus thermoglucosidasius* ldh Gene (a-6)

(SEQ ID NO: 23)
5'-TTACATATGAAACAACAAGGCATGAATCGAGTAGC-3'

-continued (b-6)
(SEQ ID NO: 24)
5'-TTAGAATTCTTATTTTACATCATCAAAATAACGGG-3'

An NdeI restriction site has been added to primer (a-6), and an EcoRI restriction site has been added to primer (b-6).
Primers for the Amplification of *Geobacillus kaustophilus* ldh Gene (a-7)
(SEQ ID NO: 25)
5'-TTACATATGAAAAACGGGAGAGGAAATCGGGTAGC-3'

(b-7)
(SEQ ID NO: 26)
5'-TTAGAATTCTTACTGAGCAAAATAGCGCGCCAATA-3'

An NdeI restriction site has been added to primer (a-7), and an EcoRI restriction site has been added to primer (b-7).
Primers for the Amplification of *Thermus thermophilus* ldh Gene (a-8)
(SEQ ID NO: 27)
5'-TTACATATGAAGGTCGGCATCGTGGGAAGCGGCAT-3'

(b-8)
(SEQ ID NO: 28)
5'-TTAGAATTCCTAAAACCCCAGGGCGAAGGCCGCCT-3'

An NdeI restriction site has been added to primer (a-8), and an EcoRI restriction site has been added to primer (b-8).
Primers for the Amplification of *Thermus thermophilus* mldh ene (a-9)
(SEQ ID NO: 29)
5'-TTACATATGAGGTGGCGGGCGGACTTCCTCTCGGC-3'

(b-9)
(SEQ ID NO: 30)
5'-TTAGAATTCTCAAGCATCGTCCCTCCAAGGCACGC-3'

An NdeI restriction site has been added to primer (a-9), and an EcoRI restriction site has been added to primer (b-9).
Primers for the Amplification of *Meiothermus ruber* mldh-1 Gene (a-10)
(SEQ ID NO: 31)
5'-TTACATATGCAAGGCATTCCTGTGCAACAACTGCG-3'

(b-10)
(SEQ ID NO: 32)
5'-TTAGAATTCTTAAAGGCCCACCGCTTTAGCGGCCT-3'

An NdeI restriction site has been added to primer (a-10), and an EcoRI restriction site has been added to primer (b-10).
Primers for the Amplification of *Meiothermus ruber* mldh-2 Gene (a-11)
(SEQ ID NO: 33)
5'-TTACATATGAGGGTTCCTTATCCCGTACTCAAGCA-3'

(b-11)
(SEQ ID NO: 34)
5'-TTTGAATTCTCATCTTGTCCCTCCTCCTTGTAGAT-3'

An NdeI restriction site has been added to primer (a-11), and an EcoRI restriction site has been added to primer (b-11).

The produced reaction solutions were subjected to electrophoresis using a 1% agarose gel, and DNA fragments of approximately 1.0-kb were detected with regard to each of *Parageobacillus thermoglucosidasius* ldh gene, *Geobacillus kaustophilus* ldh gene, *Thermus thermophilus* ldh gene, *Thermus thermophilus* mldh gene, and *Meiothermus ruber* mldh-1 gene and mldh-2 gene.

The approximately 1.0-kb DNA fragments containing each of *Parageobacillus thermoglucosidasius* ldh gene, *Geobacillus kaustophilus* ldh gene, *Thermus thermophilus* ldh gene, *Thermus thermophilus* mldh gene, and *Meiothermus ruber* mldh-1 gene and mldh-2 gene, that were amplified by the above-described PCR, were cleaved by using restriction enzymes NdeI and EcoRI. The above-mentioned approximately 10.6-kb DNA fragment of cloning vector pCYK21 was also cleaved by using restriction enzymes NdeI and EcoRI. Each of the cleaved 1.0-kb DNA fragments and the 10.6-kb DNA fragment were linked to each other using a T4 DNA Ligase (manufactured by Takara Bio Inc.).

The obtained ligation solutions were used to transform *Hydrogenophilus thermoluteolus* strain TH-1 (NBRC 14978) by electric pulse method, and the obtained transformants were applied onto A-solid medium [$(NH_4)_2SO_4$ 3.0 g, $KH_2PO_4$ 1.0 g, $K_2HPO_4$ 2.0 g, NaCl 0.25 g, $FeSO_4 \cdot 7H_2O$ 0.014 g, $MgSO_4 \cdot 7H_2O$ 0.5 g, $CaCl_2$ 0.03 g, $MoO_3$ 4.0 mg, $ZnSO_4 \cdot 7H_2O$ 28 mg, $CuSO_4 \cdot 5H_2O$ 2.0 mg, $H_3BO_3$ 4.0 mg, $MnSO_4 \cdot 5H_2O$ 4.0 mg, $CoCl_2 \cdot 6H_2O$ 4.0 mg, agar 15 g were dissolved in 1 L of distilled water (pH 7.0)] containing kanamycin at 50 µg/ml, and incubated at 50° C. for 60 hours in a chamber that was filled with a mixed gas of $H_2:O_2:CO_2$=7.5:1:1.5.

Each of the viable strains on the A-solid medium was inoculated using a platinum loop into a test tube containing 5 ml of A-liquid medium [$(NH_4)_2SO_4$ 3.0 g, $KH_2PO_4$ 1.0 g, $K_2HPO_4$ 2.0 g, NaCl 0.25 g, $FeSO_4 \cdot 7H_2O$ 0.014 g, $MgSO_4 \cdot 7H_2O$ 0.5 g, $CaCl_2$ 0.03 g, $MoO_3$ 4.0 mg, $ZnSO_4 \cdot 7H_2O$ 28 mg, $CuSO_4 \cdot 5H_2O$ 2.0 mg, $H_3BO_3$ 4.0 mg, $MnSO_4 \cdot 5H_2O$ 4.0 mg, $CoCl_2 \cdot 6H_2O$ 4.0 mg were dissolved in 1 L of distilled water (pH 7.0)] containing kanamycin at 50 µg/ml. The test tubes were filled with a mixed gas of $H_2:O_2:CO_2$=7.5:1:1.5, and subjected to shaking culture at 50° C., and plasmid DNAs were extracted from the culture solution. The plasmids, which comprise *Parageobacillus thermoglucosidasius* ldh gene, *Geobacillus kaustophilus* ldh gene, *Thermus thermophilus* ldh gene, *Thermus thermophilus* mldh gene, and *Meiothermus ruber* mldh-1 gene and mldh-2 gene, respectively, were cleaved using restriction enzymes NdeI and EcoRI, and the inserted fragments were confirmed. As a result, fragments of approximately 1.0-kb in length which were each inserted fragment of *Parageobacillus thermoglucosidasius* ldh gene, *Geobacillus kaustophilus* ldh gene, *Thermus thermophilus* ldh gene, *Thermus thermophilus* mldh gene, and *Meiothermus ruber* mldh-1 gene and mldh-2 gene, in addition to an approximately 10.6-kb DNA fragment of plasmid pCYK21 were observed.

The plasmid containing *Parageobacillus thermoglucosidasius* ldh gene was named as pC-Pth-ldh, the plasmid containing *Geobacillus kaustophilus* ldh gene was named as pC-Gka-ldh, the plasmid containing *Thermus thermophilus* ldh gene was named as pC-Tth-ldh, the plasmid containing *Thermus thermophilus* mldh gene was named as pC-Tth-mldh, the plasmid containing *Meiothermus ruber* mldh-1 gene was named as pC-Mru-mldh-1, and the plasmid containing *Meiothermus ruber* mldh-2 gene was named as pC-Mru-mldh-2.

The plasmids possessed by the recombinant strains of *Hydrogenophilus thermoluteolus* are shown in Table 1.

TABLE 1

| Strain | Plasmid | Transgene |
| --- | --- | --- |
| LDH03 | pC-Pth-ldh | ldh (*Parageobacillus thermoglucosidasius*) |
| LDH04 | pC-Gka-ldh | ldh (*Geobacillus kaustophilus*) |
| LDH05 | pC-Tth-ldh | ldh (*Thermus thermophilus*) |
| MLDH01 | pC-Tth-mldh | mldh (*Thermus thermophilus*) |
| MLDH02 | pC-Mru-mldh1 | mldh-1 (*Meiothermus ruber*) |
| MLDH03 | pC-Mru-mldh2 | mldh-2 (*Meiothermus ruber*) |

(3-2) Confirmation of Transgene Expression in *Hydrogenophilus thermoluteolus* Strain into which Lactic Acid Producing Gene has been Introduced Each lactate dehydrogenase gene or malate/lactate dehydrogenase gene-introduced strain that was obtained as described above, was inoculated using a platinum loop into a test tube containing 5 ml of A-liquid medium containing kanamycin at 50 µg/ml. The test tubes were filled with a mixed gas of $H_2:O_2:CO_2=7.5:1:1.5$, and subjected to shaking culture at 50° C. for 20 hours.

Bacterial cells thus cultured and proliferated were collected by centrifugation (4° C., 15,000 rpm, 1 minute). The bacterial cells were disrupted by sonication, and subsequently centrifuged (4° C., 15,000 rpm, 5 minutes) to obtain a cell disruption supernatant. The cell disruption supernatant was used as a crude enzyme solution to measure lactate dehydrogenase activity by the following method. Crude enzyme solution, 50 mM sodium acetate (pH 5.0), 0.5 mM NADH, 0.2 mM fructose 1,6-bisphosphate and 5 mM sodium pyruvate were mixed, reacted at 50° C., and decrease in absorbance at 340 nm coming from NADH was traced, and the initial rate of reaction was analyzed. Specific activity was calculated from the initial rate of reaction and protein concentration. The enzyme level for producing 1 µmol of lactic acid per minute was defined as 1 U (Unit).

As a result, lactate dehydrogenase activity of interest was detected in each of strain LDH03 into which *Parageobacillus thermoglucosidasius* ldh gene was introduced, strain LDH04 into which *Geobacillus kaustophilus* ldh gene was introduced, strain LDH05 into which *Thermus thermophilus* ldh gene was introduced, strain MLDH01 into which *Thermus thermophilus* mldh gene was introduced, strain MLDH02 into which *Meiothermus ruber* mldh-1 gene was introduced, and strain MLDH03 into which *Meiothermus ruber* mldh-2 gene was introduced.

TABLE 2

Lactate dehydrogenase activities of *Hydrogenophilus thermoluteolus* strains which are obtained by introducing ldh or mldh gene

| Strain | Plasmid | Transgene | Lactate dehydrogenase activity (U/mg-protein) |
| --- | --- | --- | --- |
| LDH03 | pC-Pth-ldh | ldh (*Parageobacillus thermoglucosidasius*) | 0.55 |
| LDH04 | pC-Gka-ldh | ldh (*Geobacillus kaustophilus*) | 0.14 |
| LDH05 | pC-Tth-ldh | ldh (*Thermus thermophilus*) | 1.21 |
| MLDH01 | pC-Tth-mldh | mldh (*Thermus thermophilus*) | 0.044 |
| MLDH02 | pC-Mru-mldh1 | mldh-1 (*Meiothermus ruber*) | 0.24 |
| MLDH03 | pC-Mru-mldh2 | mldh-2 (*Meiothermus ruber*) | 0.021 |
| pCYK21/TH-1 | pCYK21 | None | ND (Undetectable) |

(3-3) Production of Lactic Acid

*Hydrogenophilus thermoluteolus* strain into which lactate dehydrogenase gene was introduced, was inoculated using a platinum loop into A-liquid medium containing kanamycin at 50 µg/ml, and subjected to shaking culture at 50° C. for 30 hours while supplying a mixed gas of $H_2:O_2:CO_2=7.5:1:1.5$ during incubation.

Following incubation, a culture supernatant was obtained by centrifugation (4° C., 15,000 rpm, 1 minute), and lactic acid in the culture supernatant was quantified. As a result, lactic acid was produced in the culture supernatant, as shown in Table 3.

TABLE 3

| Strain | Plasmid | Transgene | Lactic acid concentration in culture supernatant (mM) |
| --- | --- | --- | --- |
| LDH03 | pC-Pth-ldh | ldh (*Parageobacillus thermoglucosidasius*) | 1.2 |
| LDH04 | pC-Gka-ldh | ldh (*Geobacillus kaustophilus*) | 0.7 |
| LDH05 | pC-Tth-ldh | ldh (*Thermus thermophilus*) | 1.8 |
| MLDH01 | pC-Tth-mldh | mldh (*Thermus thermophilus*) | 0.6 |
| MLDH02 | pC-Mru-mldh1 | mldh-1 (*Meiothermus ruber*) | 1.5 |
| MLDH03 | pC-Mru-mldh2 | mldh-2 (*Meiothermus ruber*) | 0.4 |
| pCYK21/TH-1 | pCYK21 | None | 0.2 |

(4) Deposited Strains

*Hydrogenophilus thermoluteolus* LDH05 strain and *Hydrogenophilus thermoluteolus* MLDH02 strain were deposited to NITE Patent Microorganisms Depositary, National Institute of Technology and Evaluation (2-5-8 Kazusakamatari, Kisarazu-shi, Chiba, Japan (postal code 292-0818)). For *Hydrogenophilus thermoluteolus* LDH05 strain, the accession number is BP-02822 and the date of acceptance is Nov. 14, 2018. For *Hydrogenophilus thermoluteolus* MLDH02 strain, the accession number is BP-02828 and the date of acceptance is Nov. 21, 2018. Accordingly, these strains are available to the public.

Furthermore, all strains (including ATCC strains and NBRC strains) that are described in the present specification are internationally deposited under the Budapest Treaty, or are possessed by organizations that furnish the strains without any terms or conditions, or are marketed, and therefore, these strains are all available to the general public.

INDUSTRIAL APPLICABILITY

The recombinant of the present invention effectively produces valine using carbon dioxide as a sole carbon source, and therefore, it is able to efficiently produce valine which can be utilized in drug, food, cosmetics, animal feed additives, and the like while solving global warming caused by increased emissions of carbon dioxide.

The transformant of the present invention effectively produces lactic acid using carbon dioxide as a sole carbon source, and therefore, it is able to efficiently produce biodegradable plastics, while solving global warming caused by increased emissions of carbon dioxide.

The invention claimed is:

1. A transformant obtained by introducing a lactate dehydrogenase gene, a malate/lactate gene, or a lactate dehydrogenase gene and a malate/lactate gene into a *Hydrogenophilus* bacterium,
wherein the lactate dehydrogenase gene comprises at least one selected from the group consisting of:
DNA which consists of a polynucleotide sequence having 90% or more identity to SEQ ID NO: 1, 2 or 3;
DNA which encodes a polypeptide consisting of an amino acid sequence having 90% or more identity to SEQ ID NO: 4, 5 or 6; and
DNA which encodes a polypeptide consisting of an amino acid sequence having a deletion, substitution, or addition of 1 to 5 of amino acids in the amino acid sequence of SEQ ID NO: 4, 5 or 6,
wherein the malate/lactate dehydrogenase gene comprises at least one selected from the group consisting of
DNA which consists of a polynucleotide sequence having 90% or more identity to SEQ ID NO: 7, 8 or 9;
DNA which encodes a polypeptide consisting of an amino acid sequence having 90% or more identity to SEQ ID NO: 10, 11 or 12; and
DNA which encodes a polypeptide consisting of an amino acid sequence having a deletion, substitution, or addition of 1 to 5 of amino acids in the amino acid sequence of SEQ ID NO: 10, 11 or 12.

2. The transformant according to claim 1, wherein the transformant is obtained by introducing the lactate dehydrogenase gene into the *Hydrogenophilus* bacterium, and the lactate dehydrogenase gene comprises the polynucleotide sequence of SEQ ID NO: 1, 2 or 3.

3. The transformant according to claim 1, wherein the transformant is obtained by introducing the lactate dehydrogenase gene into the *Hydrogenophilus* bacterium, and the lactate dehydrogenase gene comprises DNA which encodes a polypeptide consisting of the amino acid sequence of SEQ ID NO: 4, 5 or 6.

4. The transformant according to claim 1, wherein the transformant is obtained by introducing the malate/lactate gene into the *Hydrogenophilus* bacterium, and the malate/lactate dehydrogenase gene comprises the polynucleotide sequence of SEQ ID NO: 7, 8 or 9.

5. The transformant according to claim 1, wherein the transformant is obtained by introducing the malate/lactate gene into the *Hydrogenophilus* bacterium, and the malate/ lactate dehydrogenase gene comprises DNA which encodes a polypeptide consisting of the amino acid sequence of SEQ ID NO: 10, 11 or 12.

6. The transformant according to claim 1, wherein the *Hydrogenophilus* bacterium is *Hydrogenophilus thermoluteolus*.

7. The transformant according to claim 1, wherein the transformant is obtained by introducing at least the lactate dehydrogenase gene into the *Hydrogenophilus* bacterium, and the lactate dehydrogenase gene comprises the polynucleotide sequence having 90% or more identity to SEQ ID NO: 1.

8. The transformant according to claim 1, wherein the transformant is obtained by introducing at least the lactate dehydrogenase gene into the *Hydrogenophilus* bacterium, and the lactate dehydrogenase gene comprises the polynucleotide sequence having 90% or more identity to SEQ ID NO: 2.

9. The transformant according to claim 1, wherein the transformant is obtained by introducing at least the lactate dehydrogenase gene into the *Hydrogenophilus* bacterium, and the lactate dehydrogenase gene comprises the polynucleotide sequence having 90% or more identity to SEQ ID NO: 3.

10. The transformant according to claim 1, wherein the transformant is obtained by introducing at least the lactate dehydrogenase gene into the *Hydrogenophilus* bacterium, and the lactate dehydrogenase gene comprises DNA which encodes the polypeptide consisting of an amino acid sequence having 90% or more identity to SEQ ID NO: 4.

11. The transformant according to claim 1, wherein the transformant is obtained by introducing at least the lactate dehydrogenase gene into the *Hydrogenophilus* bacterium, and the lactate dehydrogenase gene comprises DNA which encodes the polypeptide consisting of an amino acid sequence having 90% or more identity to SEQ ID NO: 5.

12. The transformant according to claim 1, wherein the transformant is obtained by introducing at least the lactate dehydrogenase gene into the *Hydrogenophilus* bacterium, and the lactate dehydrogenase gene comprises DNA which encodes the polypeptide consisting of an amino acid sequence having 90% or more identity to SEQ ID NO: 6.

13. The transformant according to claim 1, wherein the transformant is obtained by introducing at least the malate/lactate gene into the *Hydrogenophilus* bacterium, and the malate/lactate dehydrogenase gene comprises the polynucleotide sequence having 90% or more identity to SEQ ID NO: 7.

14. The transformant according to claim 1, wherein the transformant is obtained by introducing at least the malate/lactate gene into the *Hydrogenophilus* bacterium, and the malate/lactate dehydrogenase gene comprises the polynucleotide sequence having 90% or more identity to SEQ ID NO: 8.

15. The transformant according to claim 1, wherein the transformant is obtained by introducing at least the malate/lactate gene into the *Hydrogenophilus* bacterium, and the malate/lactate dehydrogenase gene comprises the polynucleotide sequence having 90% or more identity to SEQ ID NO: 9.

16. The transformant according to claim 1, wherein the transformant is obtained by introducing at least the malate/lactate gene into the *Hydrogenophilus* bacterium, and the malate/lactate dehydrogenase gene comprises the polypeptide consisting of an amino acid sequence having 90% or more identity to SEQ ID NO: 10.

17. The transformant according to claim 1, wherein the transformant is obtained by introducing at least the malate/lactate gene into the *Hydrogenophilus* bacterium, and the malate/lactate dehydrogenase gene comprises the polypeptide consisting of an amino acid sequence having 90% or more identity to SEQ ID NO: 11.

18. The transformant according to claim 1, wherein the transformant is obtained by introducing at least the malate/lactate gene into the *Hydrogenophilus* bacterium, and the malate/lactate dehydrogenase gene comprises the polypeptide consisting of an amino acid sequence having 90% or more identity to SEQ ID NO: 12.

19. The transformant according to claim 1, wherein the transformant is obtained by introducing the lactate dehydrogenase gene into the *Hydrogenophilus* bacterium.

20. The transformant according to claim 1, wherein the transformant is obtained by introducing the malate/lactate gene into the *Hydrogenophilus* bacterium.

21. The transformant according to claim 1, wherein the transformant is obtained by introducing the lactate dehydrogenase gene and the malate/lactate gene into the *Hydrogenophilus* bacterium.

* * * * *